(12) United States Patent
Koyanagi

(10) Patent No.: US 7,586,988 B2
(45) Date of Patent: Sep. 8, 2009

(54) TRANSMITTING APPARATUS, RECEIVING APPARATUS, COMMUNICATION SYSTEM, AND MULTIPLEX TIMING COMPENSATION METHOD

(75) Inventor: Kenji Koyanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 1117 days.

(21) Appl. No.: 10/885,902

(22) Filed: Jul. 8, 2004

(65) Prior Publication Data
US 2005/0013327 A1  Jan. 20, 2005

(30) Foreign Application Priority Data
Jul. 11, 2003  (JP) .............................. 2003-273422

(51) Int. Cl.
*H04K 1/10* (2006.01)
(52) U.S. Cl. ..................... 375/260; 370/210; 370/211; 455/59
(58) Field of Classification Search ................ 375/260; 370/210, 211; 455/59
See application file for complete search history.

(56) References Cited

U.S. PATENT DOCUMENTS 6,985,432 B1 * 1/2006 Hadad ....................... 370/203

2001/0050963 A1 * 12/2001 Yoneyama ................... 375/267
2002/0118771 A1 * 8/2002 Larsson ...................... 375/267

FOREIGN PATENT DOCUMENTS

| JP | 2000-68972 | 3/2000 |
| JP | 2000-332722 | 11/2000 |
| JP | 2001-257656 | 9/2001 |
| JP | 2002-204215 | 7/2002 |
| JP | 2003-510952 | 3/2003 |

* cited by examiner

*Primary Examiner*—Juan A Torres
(74) *Attorney, Agent, or Firm*—McGinn IP Law Group, PLLC

(57) ABSTRACT

This invention provides a transmitting apparatus including a plurality of signal generation units, a multiplexing unit which receives a plurality of signals output from the plurality of signal generation units and outputs, as a transmission signal, a signal obtained by time-divisionally multiplexing the plurality of signals, and a correction signal generation unit which outputs a correction signal generated on the basis of the transmission signal output from the multiplexing unit to all or some of the plurality of signal generation units, wherein upon receiving the correction signal, the plurality of signal generation units correct the shift of input timing of the plurality of signals to the multiplexing unit on the basis of the correction signal.

26 Claims, 11 Drawing Sheets

TRANSMITTING APPARATUS, RECEIVING APPARATUS, COMMUNICATION SYSTEM, AND MULTIPLEX TIMING COMPENSATION METHOD

BACKGROUND OF THE INVENTION

1. Field of the Invention

The present invention relates to a transmitting apparatus, receiving apparatus, communication system, and multiplex timing compensation method and, more particularly, to a transmitting apparatus, receiving apparatus, communication system, and signal multiplex timing compensation method which control a shift in input timing between a plurality of signals to a multiplexing unit, which occurs due to a wiring delay.

2. Description of the Related Art

An OFDM (Orthogonal Frequency Division Multiplexing) method is known as a method of transmitting digital data.

According to the OFDM method, a plurality of carrier waves (to be referred to as "subcarriers" hereinafter) which are orthogonal to each other are prepared in a predetermined transmission bandwidth. By using inverse Fourier transform, the subcarriers are modulated (OFDM-modulated) at once on the basis of digital information to be transmitted. The modulated subcarriers are synthesized, i.e., multiplexed, and the multiplexed signal (OFDM signal) is transmitted.

In the OFDM method, Fourier transform is used to demodulate the OFDM signal obtained by OFDM modulation. In the OFDM method, pilot symbols (pilot samples) which are used even as information to, e.g., correct the Fourier transform start timing are sometimes inserted between data symbols (patent reference 1: JP 2003-510952).

FIG. 17 is a block diagram for explaining an OFDM communication system described in patent reference 1. The OFDM communication system described in patent reference 1 will briefly be described below with reference to FIG. 17. The OFDM communication system shown in FIG. 17 uses N subcarriers.

Referring to FIG. 17, a pilot symbol inserter 101 receives a data symbol stream and inserts pilot symbols to the symbols of the received data symbol stream at a predetermined interval.

A serial-parallel converter 103 separates the symbol output from the pilot symbol inserter 101 into N samples and parallelly supplies the separated samples to an inverse fast Fourier transformer (to be referred to as an "IFFT" hereinafter) 105.

The IFFT 105 receives the N samples output from the serial-parallel converter 103, executes inverse fast Fourier transform (to be referred to as "inverse Fourier transform" hereinafter), i.e., OFDM modulation to generate an OFDM symbol, and outputs the generated OFDM symbol to a guard interval (to be referred to as "GI" hereinafter) inserter 107.

The GI inserter 107 inserts a guard interval before the OFDM symbol to generate an OFDM signal.

A digital/analog converter (to be referred to as a "DAC" hereinafter) 109 converts the OFDM signal output from the GI inserter 107 into an analog OFDM transmission signal and transmits it.

The transmitted OFDM transmission signal is received by an analog/digital converter (to be referred to as an "ADC" hereinafter) 111.

The ADC 111 converts the received OFDM transmission signal into a digital OFDM signal containing a GI and N OFDM samples and outputs the digital OFDM signal to a GI remover 112.

The GI remover 112 removes the GI contained in the received OFDM signal and outputs an OFDM symbol containing the N OFDM samples.

The ADC 111 and GI remover 112 are operated by a predetermined timing error estimation signal.

A fast Fourier transformer (to be referred to as an "FFT" hereinafter) 114 receives the OFDM symbol containing the N OFDM samples, executes fast Fourier transform (to be referred to as "Fourier transform" hereinafter), i.e., OFDM demodulation for the N received OFDM samples, and outputs the N demodulated samples.

The N samples output from the FFT 114 are converted into a symbol by a parallel-serial converter 115 and provided to a pilot symbol detector 116.

The pilot symbol detector 116 detects a pilot symbol from the symbol output from the parallel-serial converter 115 and outputs the detected pilot symbol to a timing compensator 117. The pilot symbol detector 116 also outputs the symbol without the pilot symbol, i.e., a data symbol.

Upon receiving the pilot symbol from the pilot symbol detector 116, the timing compensator 117 obtains a timing error on the basis of the received pilot symbol, compensates for the obtained timing error, and outputs a timing error estimation signal to the ADC 111 and GI remover 112.

The timing compensator 117 will be described below.

The timing compensator 117 obtains the difference between a reference phase known in advance and the phase of the pilot symbol detected by the pilot symbol detector 116 and estimates the timing error by using the change ratio of the value. Note that a technique is known, which measures a delay profile from a pilot symbol and estimates a timing error on the basis of the measured delay profile.

In some transmitting apparatuses for transmitting information by the OFDM method, a plurality of OFDM signals are multiplexed and, more specifically, time-divisionally multiplexed in an analog manner, and the time-divisionally multiplexed signal is transmitted to a receiving apparatus by reason of apparatus implementation.

FIGS. 18A and 18B are block diagrams respectively showing a transmitting apparatus and a receiving apparatus which communicate by using a multiplexed OFDM signal.

Referring to FIGS. 18A and 18B, a transmitting apparatus 1201 includes a first signal generation unit 103, second signal generation unit 104, and multiplexing unit 105. FIGS. 18A and 18B show only two signal generation units. However, the number of signal generation units is not limited to two and may be three or more.

A first signal generation unit 103 generates a first OFDM signal SS0(1). The second signal generation unit 104 generates a second OFDM signal SS0(2). A plurality of subcarriers (carrier waves) in the first OFDM signal SS0(1) are identical to those in the second OFDM signal SS0(2).

The multiplexing unit 105 multiplexes the first OFDM signal SS0(1) and second OFDM signal SS0(2) in an analog manner. More specifically, the multiplexing unit 105 time-divisionally multiplexes the first OFDM signal SS0(1) and second OFDM signal SS0(2). The multiplexing unit 105 transmits the time-divisionally multiplexed signal as a transmission signal STX. The multiplexing unit 105 loads the plurality of received signals at a common timing and time-divisionally multiplexes the plurality of signals loaded at the common timing.

A receiving apparatus 1202 comprises a demodulation unit 107 and data reproduction unit 108.

The demodulation unit 107 receives a reception signal SRX corresponding to the transmission signal STX, executes OFDM demodulation for the received reception signal SRX, and outputs a demodulated signal SDMO.

The data reproduction unit 108 executes symbol determination for the demodulated signal SDMO and outputs the symbol determination result as a demodulated data sequence SRDAT.

When a plurality of OFDM signals are to be multiplexed and, more specifically, time-divisionally multiplexed in an analog manner, the input timing of the plurality of OFDM signals to the multiplexing unit varies in some cases. This variation occurs on the basis of, e.g., the difference in cable length between the OFDM signal generation units and the multiplexing unit or the individual difference between the signal generation units.

If the input timing of the plurality of OFDM signals to the multiplexing unit varies, the multiplexing timing by the multiplexing unit also varies.

FIGS. 19 and 20 are explanatory views for explaining the shift of multiplexing timing by the multiplexing unit. The same reference numerals as in FIGS. 18A and 18B denote the same parts in FIGS. 19 and 20.

FIG. 19 shows the state of a time-divisionally multiplexed signal 105*a* output from the multiplexing unit 105 when the second OFDM signal SS0(2) output from the second signal generation unit 104 is supplied to the multiplexing unit 105 with a delay $\Delta t$ with respect to the first OFDM signal SS0(1) output from the first signal generation unit 103.

FIG. 20 shows the state of a time-divisionally multiplexed signal 105*b* output from the multiplexing unit 105 when the second OFDM signal SS0(2) output from the second signal generation unit 104 is supplied to the multiplexing unit 105 simultaneously with the first OFDM signal SS0(1) output from the first signal generation unit 103.

The second OFDM signal SS0(2) contained in the time-divisionally multiplexed signal 105*a* shown in FIG. 19 has the delay $\Delta t$ with respect to the first OFDM signal SS0(1) as compared to that contained in the time-divisionally multiplexed signal 105*b* shown in FIG. 20.

When data is to be acquires by demodulating the second OFDM signal SS0(2) contained in the time-divisionally multiplexed signal 105*b* shown in FIG. 20, a data acquisition error caused by $\Delta t$ can occur. If a data acquisition error occurs, the communication quality becomes poor.

The problem of poor communication quality based on the variation of multiplexing timing by the multiplexing unit rises not only when OFDM signals are time-divisionally multiplexed but also when the multiplexing unit time-divisionally multiplexes a plurality of signals.

SUMMARY OF THE INVENTION

The present invention has been made in consideration of the above problem, and has as its object to provide a transmitting apparatus, receiving apparatus, communication system, and signal multiplex timing compensation method which can suppress any decrease in communication quality based on a variation of multiplexing timing, which can occur in time-divisionally multiplexing a plurality of signals.

In order to achieve the above object, according to the first aspect of the present invention, there is provided a transmitting apparatus comprising a plurality of signal generation units, a multiplexing unit which receives a plurality of signals output from the plurality of signal generation units and outputs, as a transmission signal, a signal obtained by time-divisionally multiplexing the plurality of signals, and a correction signal generation unit which outputs a correction signal generated on the basis of the transmission signal output from the multiplexing unit to all or some of the plurality of signal generation units, wherein upon receiving the correction signal, the plurality of signal generation units correct a shift of input timing of the plurality of signals to the multiplexing unit on the basis of the correction signal.

According to the second aspect of the present invention, in the transmitting apparatus of the first aspect, each of the plurality of signal generation units outputs a signal containing a pilot symbol, and the correction signal generation unit outputs the correction signal generated on the basis of the pilot symbol in each signal contained in the transmission signal to all or some of the plurality of signal generation units.

According to the third aspect of the present invention, in the transmitting apparatus of the first or second aspect, the plurality of signal generation units output a plurality of OFDM signals each having a plurality of subcarriers.

According to the fourth aspect of the present invention, there is provided a communication system comprising a transmitting apparatus of any one of the first to third aspects and a receiving apparatus which receives a transmission signal output from the transmitting apparatus.

According to the fifth aspect of the present invention, there is provided a receiving apparatus which receives a transmission signal transmitted from a transmitting apparatus including a plurality of signal generation units, and a multiplexing unit which receives a plurality of signals output from the plurality of signal generation units and outputs, as the transmission signal, a signal obtained by time-divisionally multiplexing the plurality of signals, comprising a demodulation unit which receives the transmission signal output from the transmitting apparatus and outputs a demodulated signal obtained by demodulating the received transmission signal, a data reproduction unit which receives the demodulated signal output from the demodulation unit, executes symbol determination for the receive demodulated signal, and outputs a result of symbol determination as a demodulated data sequence, and a correction signal generation unit which output, to the demodulation unit, a correction signal generated on the basis of the demodulated signal output from the demodulation unit, wherein the demodulation unit corrects a shift of input timing of the plurality of signals to the multiplexing unit on the basis of the correction signal generated by the correction signal generation unit, the shift being a shift contained in the received transmission signal.

According to the sixth aspect of the present invention, in the receiving apparatus of the fifth aspect, each of the plurality of signal generation units outputs a signal containing a pilot symbol, and the correction signal generation unit outputs, to the demodulation unit, the correction signal generated on the basis of the pilot symbol in each signal contained in the received transmission signal.

According to the seventh aspect of the present invention, in the receiving apparatus of the fifth or sixth aspect, the plurality of signal generation units output a plurality of OFDM signals each having a plurality of subcarriers.

According to the eighth aspect of the present invention, there is provided a communication system comprising an OFDM transmitting apparatus including a plurality of signal generation units, and a multiplexing unit which receives a plurality of signals output from the plurality of signal generation units and outputs, as a transmission signal, a signal obtained by time-divisionally multiplexing the plurality of signals, and an OFDM receiving apparatus of any one of the fifth to seventh aspects.

According to the ninth aspect of the present invention, there is provided a multiplex timing compensation method executed by a transmitting apparatus including a plurality of signal generation units, and a multiplexing unit which receives a plurality of signals output from the plurality of signal generation units and outputs, as a transmission signal, a signal obtained by time-divisionally multiplexing the plurality of signals, comprising the correction signal generation step of outputting a correction signal generated on the basis of the transmission signal output from the multiplexing unit to all or some of the plurality of signal generation units, and the correction step of correcting a shift of input timing of the plurality of signals to the multiplexing unit on the basis of the correction signal output in the correction signal generation step.

According to the 10th aspect of the present invention, there is provided a multiplex timing compensation method comprising the demodulation step of receiving a transmission signal transmitted from a transmitting apparatus including a plurality of signal generation units, and a multiplexing unit which receives signals output from the plurality of signal generation units, and outputs, as the transmission signal, a signal obtained by time-divisionally multiplexing the plurality of signals, and outputting a demodulated signal obtained by demodulating the received transmission signal, the data reproduction step of receiving the demodulated signal output in the demodulation step, executing symbol determination for the receive demodulated signal, and outputting a result of symbol determination as a demodulated data sequence, the correction signal generation step of generating a correction signal to correct a shift of input timing of the plurality of signals to the multiplexing unit on the basis of the demodulated signal output in the demodulation step, the shift being a shift contained in the received transmission signal, and the correction step of correcting the shift of input timing of the plurality of signals to the multiplexing unit on the basis of the correction signal generated in the correction signal generation step, the shift being the shift contained in the received transmission signal.

According to the 11th aspect of the present invention, in the multiplex timing compensation method of the ninth or 10th aspect, the plurality of signal generation units output a plurality of signals each containing a pilot symbol, and in the correction signal generation step, the correction signal generated on the basis of the pilot symbol in each signal contained in the transmission signal is output to all or some of the plurality of signal generation units.

According to the 12th aspect of the present invention, in the multiplex timing compensation method of any one of the ninth to 11th aspects, the plurality of signal generation units output OFDM signals each having a plurality of subcarriers.

As is apparent from the above-described aspects and claims to be described later, the shift of input timing of a plurality of signals to the multiplexing unit can be compensated for in the transmitting apparatus or receiving apparatus. Hence, any decrease in communication quality based on the shift of input timing of the plurality of signals to the multiplexing unit can be prevented.

The correction signal to correct the shift of input timing of the plurality of signals to the multiplexing unit is generated on the basis of pilot symbols contained in the plurality of signals which are multiplexed. For this reason, the correction signal can be generated by using existing pilot symbols.

When the plurality of signal generation units output OFDM signals each having a plurality of subcarriers, the shift of input timing of a plurality of OFDM signals to the multiplexing unit can be compensated for in the OFDM transmitting apparatus or OFDM receiving apparatus. Hence, any decrease in communication quality based on the variation of input timing of the plurality of OFDM signals to the multiplexing unit can be prevented.

The correction signal to correct the shift of input timing of the plurality of OFDM signals to the multiplexing unit is generated on the basis of pilot symbols contained in the plurality of OFDM signals which are multiplexed. For this reason, the correction signal can be generated by using existing pilot symbols.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Preferred embodiments of the present invention will be described below in detail with reference to the accompanying drawings.

Figure 1A:
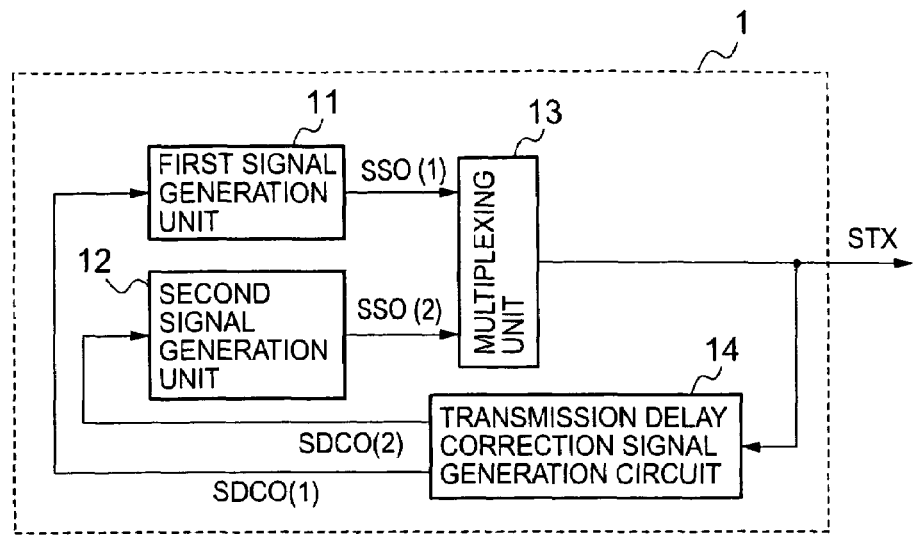
FIGS. 1A and 1B are block diagrams respectively showing a transmitting apparatus and a receiving apparatus in an OFDM communication system according to an embodiment of the present invention.
Figure 1B:
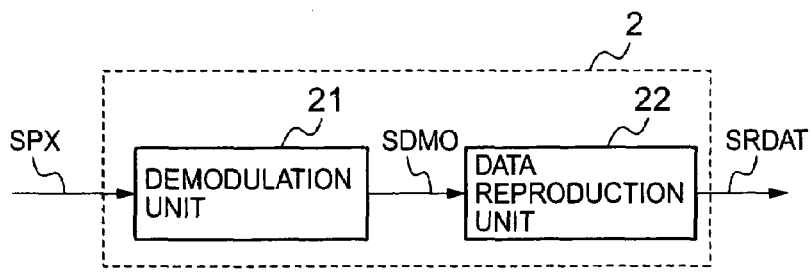

Referring to FIGS. 1A and 1B, the OFDM communication system includes an OFDM transmitting apparatus 1 and OFDM receiving apparatus 2. The OFDM transmitting apparatus 1 includes a first signal generation unit 11, second signal generation unit 12, multiplexing unit 13, and transmission delay correction signal generation circuit 14.

In this embodiment, two signal generation units are used as the plurality of signal generation units. However, the number of the plurality of signal generation units is not limited to two and can appropriately be changed.

The first signal generation unit 11 outputs a first OFDM signal SS0(1) to which pilot symbols are inserted at a predetermined interval. The first signal generation unit 11 controls the first OFDM signal SS0(1) on the basis of a compensation signal SDCO(1) output from the transmission delay correction signal generation circuit 14.

The second signal generation unit 12 outputs a second OFDM signal SS0(2) to which pilot symbols are inserted at a predetermined interval. The second signal generation unit 12 controls the second OFDM signal SS0(2) on the basis of a compensation signal SDCO(2) output from the transmission delay correction signal generation circuit 14.

A plurality of subcarriers (carrier waves) in the first OFDM signal SS0(1) are identical to those in the second OFDM signal SS0(2). The first OFDM signal SS0(1) and second OFDM signal SS0(2) are output at the same timing at the initial stage.

The multiplexing unit 13 multiplexes and, more specifically, time-divisionally multiplexes the first OFDM signal SS0(1) and second OFDM signal SS0(2) in an analog manner. The multiplexing unit 13 transmits the time-divisionally multiplexed signal as a transmission signal STX. The multiplexing unit 13 loads the plurality of received signals at a common timing and time-divisionally multiplexes the plurality of signals loaded at the common timing.

On the basis of the transmission signal STX output from the multiplexing unit 13, the transmission delay correction signal generation circuit 14 serving as a correction signal generation unit generates a compensation signal (correction signal) SDCO to correct the shift of the input timing of the plurality of OFDM signals to the multiplexing unit 13.

More specifically, the transmission delay correction signal generation circuit 14 generates the delay profile of each of the plurality of OFDM signals on the basis of the pilot symbols of the plurality of OFDM signals contained in the transmission signal STX. Then, on the basis of the plurality of generated delay profiles, the transmission delay correction signal generation circuit 14 generates the compensation signal SDCO to correct the shift of input timing of the plurality of OFDM signals to the multiplexing unit 13.

When two OFDM signals are used as the plurality of OFDM signals, as in this embodiment, the transmission delay correction signal generation circuit 14 generates the delay profile of the first OFDM signal SS0(1) on the basis of pilot symbols contained in it. In addition, the transmission delay correction signal generation circuit 14 generates the delay profile of the second OFDM signal SS0(2) on the basis of pilot symbols contained in it.

On the basis of the delay profile of the first OFDM signal SS0(1) and that of the second OFDM signal SS0(2), the transmission delay correction signal generation circuit 14 generates the compensation signal SDCO to correct the shift of input timing of the OFDM signals including the first OFDM signal SS0(1) and second OFDM signal SS0(2) to the multiplexing unit 13.

The shift of input timing of the plurality of OFDM signals to the multiplexing unit 13 depends on the difference between delays generated while the plurality of OFDM signals are transmitted from the signal generation units to the multiplexing unit.

For example, when the number of the plurality of OFDM signals is two, as in this embodiment, the shift of input timing of the plurality of OFDM signals to the multiplexing unit 13 depends on the difference between a delay generated while the first OFDM signal SS0(1) is transmitted from the first signal generation unit 11 to the multiplexing unit 13 and a delay generated while the second OFDM signal SS0(2) is transmitted from the second signal generation unit 12 to the multiplexing unit 13.

The transmission delay correction signal generation circuit 14 outputs the generated compensation signal to all or some of the plurality of signal generation units, i.e., both or one of the first signal generation unit 11 and second signal generation unit 12 in this embodiment.

The OFDM receiving apparatus 2 includes a demodulation unit 21 and data reproduction unit 22.

The demodulation unit 21 receives a reception signal SRX corresponding to the transmission signal STX, executes OFDM demodulation for the received reception signal SRX, and outputs a demodulated signal SDMO generated by OFDM demodulation.

The data reproduction unit 22 executes symbol determination for the demodulated signal SDMO and outputs the symbol determination result as a demodulated data sequence SRDAT.

Figure 2:
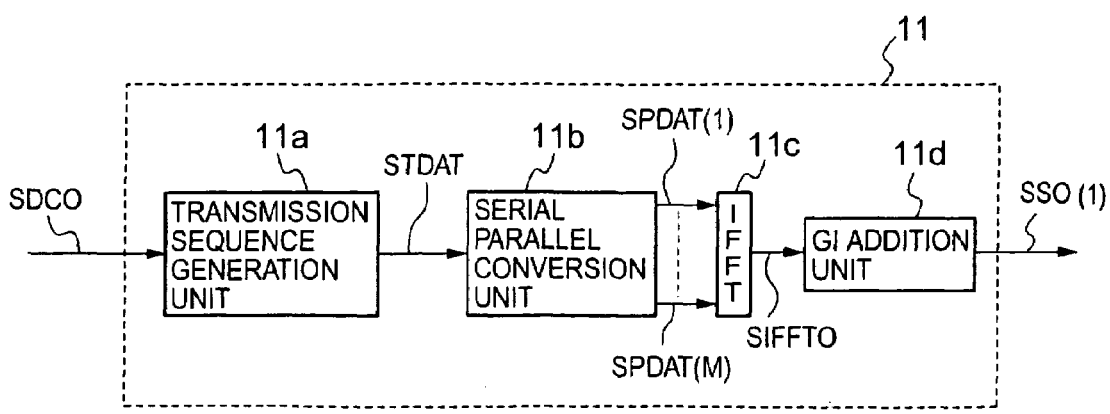
FIG. 2 is a block diagram showing an example of a first signal generation unit 11 shown in FIG. 1A.

FIG. 2 is a block diagram showing an example of the first signal generation unit 11. The arrangement of the second signal generation unit 12 is the same as that of the first signal generation unit 11, and a description thereof will be omitted.

Referring to FIG. 2, the first signal generation unit 11 includes a transmission sequence generation unit 11a, serial-parallel conversion unit 11b, inverse fast Fourier transform unit (to be referred to as an "IFFT" hereinafter) 11c, and guard interval (to be referred to as "GI" hereinafter) addition unit 11d.

The transmission sequence generation unit 11a generates a data symbol stream STDAT by inserting, at a predetermined interval, pilot symbols to a data symbol stream in which a plurality of pilot symbols are arranged in series. The transmission sequence generation unit 11a outputs the generated data symbol stream STDAT to the serial-parallel conversion unit 11b.

On the basis of the compensation signal SDCO output from the transmission delay correction signal generation circuit 14, the transmission sequence generation unit 11a controls the data symbol stream STDAT to correct the shift of input timing of the plurality of OFDM signals to the multiplexing unit 13.

For example, the transmission sequence generation unit 11a corrects, on the basis of the compensation signal SDCO, the output timing of the data symbol stream STDAT such that the shift of input timing of the plurality of OFDM signals to the multiplexing unit 13 is corrected on the time axis.

The serial-parallel conversion unit 11b separates each symbol in the data symbol stream STDAT output from the transmission sequence generation unit 11a into M samples (M equals the number of subcarriers in the OFDM signal) and parallelly outputs the M separated samples SPDAT(1) to SPDAT(M).

The IFFT 11c executes inverse fast Fourier transform (to be referred to as "inverse Fourier transform" hereinafter), i.e., OFDM modulation for the M samples SPDAT(1) to SPDAT (M) output from the serial-parallel conversion unit 11b to generate an OFDM symbol SIFFTO and outputs the generated OFDM symbol SIFFTO to the GI addition unit 11d.

The GI addition unit 11d inserts a guard interval before the OFDM symbol SIFFTO and outputs the OFDM symbol SIFFTO with the guard interval inserted as the OFDM signal SS0(1).

Figure 3:
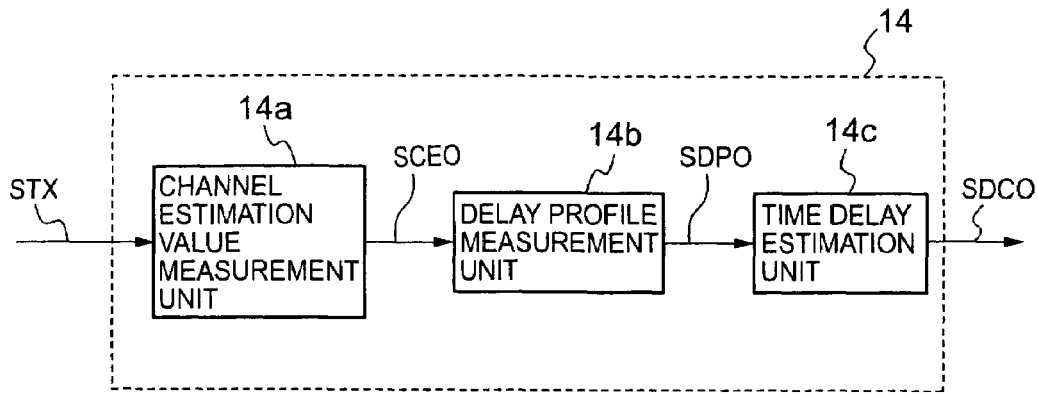
FIG. 3 is a block diagram showing an example of a transmission delay correction signal generation circuit 14 shown in FIG. 1A.

FIG. 3 is a block diagram showing an example of the transmission delay correction signal generation circuit 14.

Referring to FIG. 3, the transmission delay correction signal generation circuit 14 includes a channel estimation value measurement unit 14a, delay profile measurement unit 14b, and time delay estimation unit 14c.

The channel estimation value measurement unit 14a executes channel estimation corresponding to each OFDM signal in the transmission signal STX on the basis of the pilot symbols contained in the OFDM signal and outputs the channel estimation result as a channel estimation signal SCEO.

More specifically, the channel estimation value measurement unit 14a detects the pilot symbols contained in the first OFDM signal SS0(1) in the transmission signal STX, executes channel estimation corresponding to the first OFDM signal SS0(1) on the basis of the detected pilot symbols, and outputs the channel estimation result as a first channel estimation signal SCEO(1).

In addition, the channel estimation value measurement unit 14a detects the pilot symbols contained in the second OFDM signal SS0(2) in the transmission signal STX, executes channel estimation corresponding to the second OFDM signal SS0(2) on the basis of the detected pilot symbols, and outputs the channel estimation result as a second channel estimation signal SCEO(2).

The delay profile measurement unit 14b generates a delay profile for each OFDM signal on the basis of the channel estimation signal SCEO for each OFDM signal, which is output from the channel estimation value measurement unit 14a, and outputs the generated delay profile as a delay profile signal SDPO.

More specifically, the delay profile measurement unit 14b generates a delay profile signal SDPO(1) corresponding to the first OFDM signal SS0(1) on the basis of the first channel estimation signal SCEO(1). The delay profile measurement unit 14b generates a delay profile signal SDPO(2) corresponding to the second OFDM signal SS0(2) on the basis of the second channel estimation signal SCEO(2).

On the basis of the delay profile signal SDPO for each OFDM signal, which is output from the delay profile measurement unit 14b, the time delay estimation unit 14c detects the time lag of input timing of the plurality of OFDM signals to the multiplexing unit 13. The detected time lag is used as the time delay correction signal SDCO to correct the time lag of input timing of the plurality of OFDM signals to the multiplexing unit 13. The time delay estimation unit 14c outputs the time delay correction signal SDCO to both or one of the first signal generation unit 11 and second signal generation unit 12 as the plurality of signal generation units.

Figure 4:
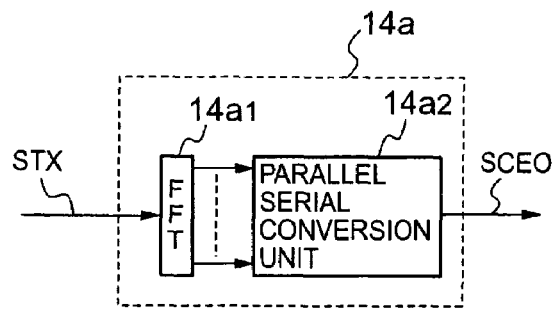
FIG. 4 is a block diagram showing an example of a channel estimation value measurement unit 14a shown in FIG. 3.

Referring to FIG. 4 which shows an example of the channel estimation value measurement unit 14a, the channel estimation value measurement unit 14a includes an FFT 14a1 and parallel-serial conversion unit 14a2.

The FFT 14a1 Fourier-transforms the transmission signal STX during a period when the pilot symbols contained in the OFDM signal in the transmission signal STX are present.

That is, the FFT 14a1 Fourier-transforms the pilot symbols contained in the OFDM signal in the transmission signal STX.

The period when the pilot symbols are present is determined in advance. The shift of multiplexing timing of the multiplexing unit 13 is compensated for by the guard interval added to each pilot symbol. Hence, the FFT 14a1 can Fourier-transform the pilot symbols contained in the OFDM signal in the transmission signal STX.

The parallel-serial conversion unit 14a2 parallel-serial-converts outputs from the FFT 14a1 and outputs the serially arranged outputs from the FFT 14a1 as the channel estimation signal SCEO. The channel estimation signal SCEO generated on the basis of the pilot symbols contained in the first OFDM signal SS0(1) serves as the first channel estimation signal SCEO(1). The channel estimation signal SCEO generated on the basis of the pilot symbols contained in the second OFDM signal SS0(2) serves as the second channel estimation signal SCEO(2).

Figure 5:
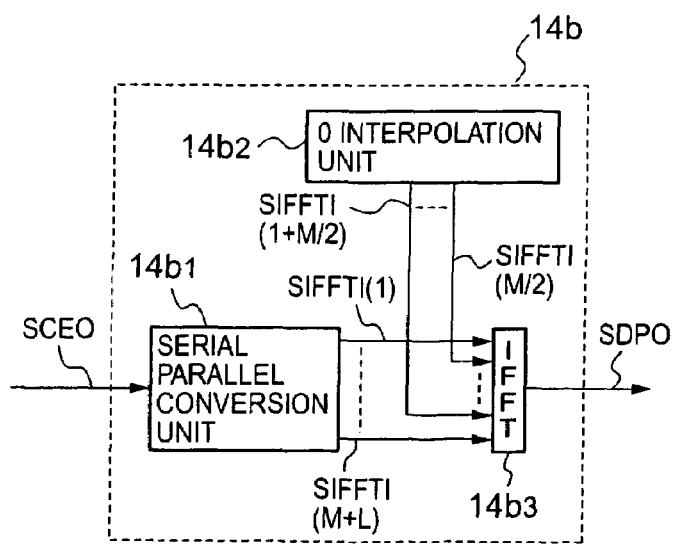
FIG. 5 is a block diagram showing an example of a delay profile measurement unit 14b shown in FIG. 3.

Referring to FIG. 5 which shows an example of the delay profile measurement unit 14b, the delay profile measurement unit 14b includes a serial-parallel conversion unit 14b1, 0-interpolation unit 14b2, and IFFT 14b3.

The serial-parallel conversion unit 14b1 converts the channel estimation signal SCEO into M parallel data signals SIFFTI(1) to SIFFTI(M).

The 0-interpolation unit 14b2 interpolates L (L is an integer; $L \geq 1$) samples 0 between SIFFTI(M/2) and SIFFTI(M/2+1) of the parallel data signals SIFFTI(1) to SIFFTI(M) to generate (M+L) inverse Fourier transform unit input signals SIFFTI(1) to SIFFTI(M+L).

In this embodiment, the parallel-serial conversion unit 14a2 shown in FIG. 4 and the serial-parallel conversion unit 14b1 shown in FIG. 5 are used. However, the parallel-serial conversion unit 14a2 shown in FIG. 4 and the serial-parallel conversion unit 14b1 shown in FIG. 5 may be omitted. Instead, the outputs from the FFT 14a1 shown in FIG. 4 may be input to the IFFT 14b3.

Figure 6A:
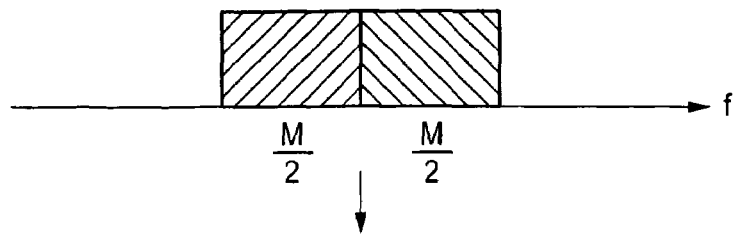
FIGS. 6A and 6B are views for explaining processing by a 0-interpolation unit 14b2 shown in FIG. 5.
Figure 6B:
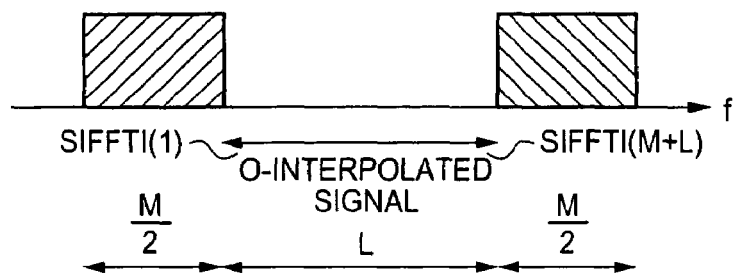

FIGS. 6A and 6B are views for explaining processing by the 0-interpolation unit 14b2. More specifically, FIG. 6A is an explanatory view in which the M parallel data signals SIFFTI(1) to SIFFTI(M) before 0-interpolation are arranged on the frequency axis. FIG. 6B is an explanatory view in which the (M+L) inverse Fourier transform unit input signals SIFFTI(1) to SIFFTI(M+L) after 0-interpolation by the 0-interpolation unit 14b2 are arranged on the frequency axis.

Referring back to FIG. 5, the IFFT 14b3 inverse-Fourier-transforms the inverse Fourier transform unit input signals SIFFTI(1) to SIFFTI(M+L) and outputs the delay profile signal SDPO detected at a resolution of M/(M+L) samples.

The delay profile signal SDPO generated on the basis of the first channel estimation signal SCEO(1) serves as the delay profile signal SDPO(1). The delay profile signal SDPO generated on the basis of the second channel estimation signal SCEO(2) serves as the delay profile signal SDPO(2).

The operation will be described next.

Figure 7:
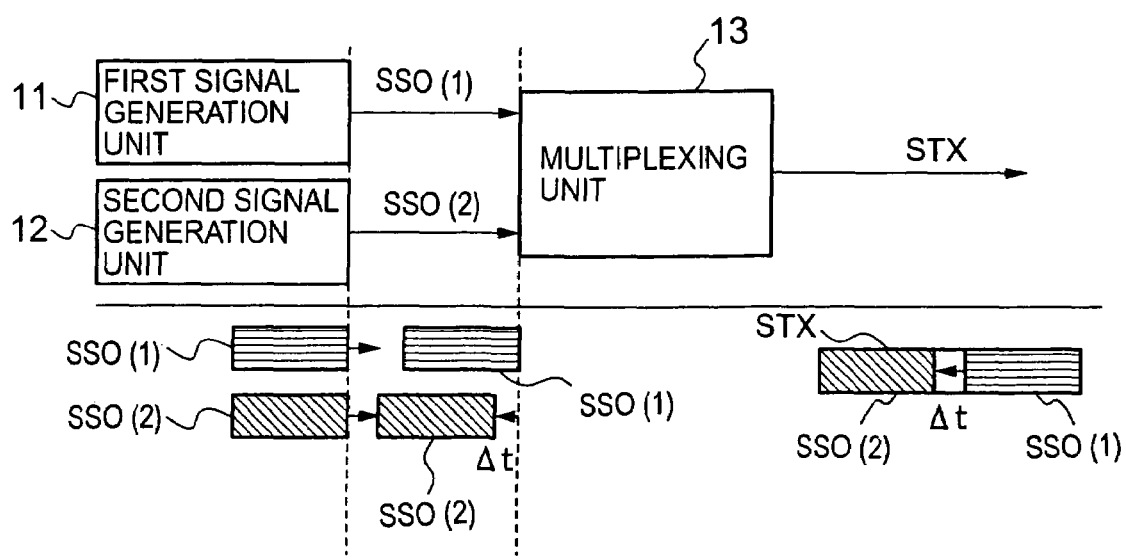
FIG. 7 is a view for explaining the operation of the OFDM communication system shown in FIGS. 1A and 1B.
Figure 8:
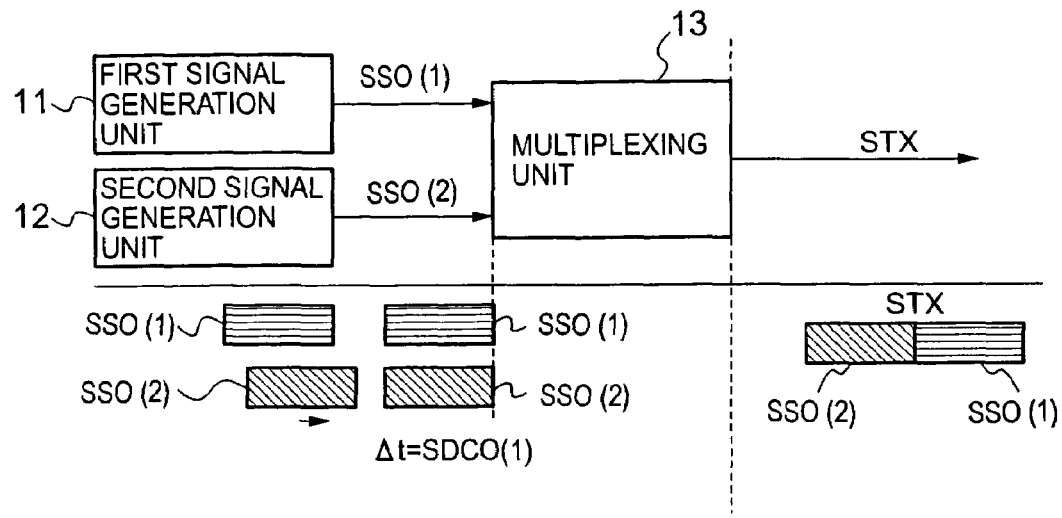
FIG. 8 is a view for explaining the operation of the OFDM communication system shown in FIGS. 1A and 1B.

FIGS. 7 and 8 are views for explaining an operation for compensating for the shift of input timing of the first OFDM signal SS0(1) and second OFDM signal SS0(2) to the multiplexing unit 13 on the time axis. The same reference numerals as in the above-described drawings denote the same parts in FIGS. 7 and 8.

Even when the first OFDM signal SS0(1) from the first signal generation unit 11 and the second OFDM signal SS0 (2) from the second signal generation unit 12 are output at the same timing, the input timing of the first OFDM signal SS0(1) to the multiplexing unit 13 may be different from the input timing of the second OFDM signal SS0(2) to the multiplexing unit 13 because of the difference in length between the cable that transmits the first OFDM signal SS0(1) and the cable that transmits the second OFDM signal SS0(2).

For example, as shown in FIG. 7, when the second OFDM signal SS0(2) is input to the multiplexing unit 13 with a time delay $\Delta t$ with respect to the first OFDM signal SS0(1), the multiplexing timing in the multiplexing unit 13 shifts by $\Delta t$. In this case, the second OFDM signal SS0(2) contained in the transmission signal STX output from the multiplexing unit 13 is delayed by $\Delta t$ as compared to a signal without the delay $\Delta t$.

The transmission delay correction signal generation circuit 14 measures the delay profile of the first OFDM signal SS0(1) and that of the second OFDM signal SS0(2), measures the time shift $\Delta t$ of the multiplexing timing in the multiplexing unit 13 on the basis of the two measured delay profiles, and transmits the time compensation signal SDCO(2)=$\Delta t$ to the second signal generation unit 12.

More specifically, the channel estimation value measurement unit 14a in the transmission delay correction signal generation circuit 14 detects the pilot symbols contained in the first OFDM signal SSD(1) in the transmission signal STX, executes channel estimation corresponding to the first OFDM signal SS0(1) on the basis of the detected pilot symbols, and outputs the channel estimation result as the first channel estimation signal SCEO(1).

In addition, the channel estimation value measurement unit 14a detects the pilot symbols contained in the second OFDM signal SS0(2) in the transmission signal STX, executes channel estimation corresponding to the second OFDM signal SS0(2) on the basis of the detected pilot symbols, and outputs the channel estimation result as the second channel estimation signal SCEO(2).

The delay profile measurement unit 14b generates the delay profile signal SDPO(1) corresponding to the first OFDM signal SS0(1) on the basis of the first channel estimation signal SCEO(1). The delay profile measurement unit 14b also generates the delay profile signal SDPO(2) corresponding to the second OFDM signal SS0(2) on the basis of the second channel estimation signal SCEO(2).

On the basis of the delay profile signal SDPO for each OFDM signal, which is output from the delay profile measurement unit 14b, the time delay estimation unit 14c detects the time lag of input timing of the plurality of OFDM signals to the multiplexing unit 13. The detected time lag is used as the time delay correction signal SDCO to correct the time lag of input timing of the plurality of OFDM signals to the multiplexing unit 13. The time delay correction signal SDCO is output to the second signal generation unit 12.

Figure 9:
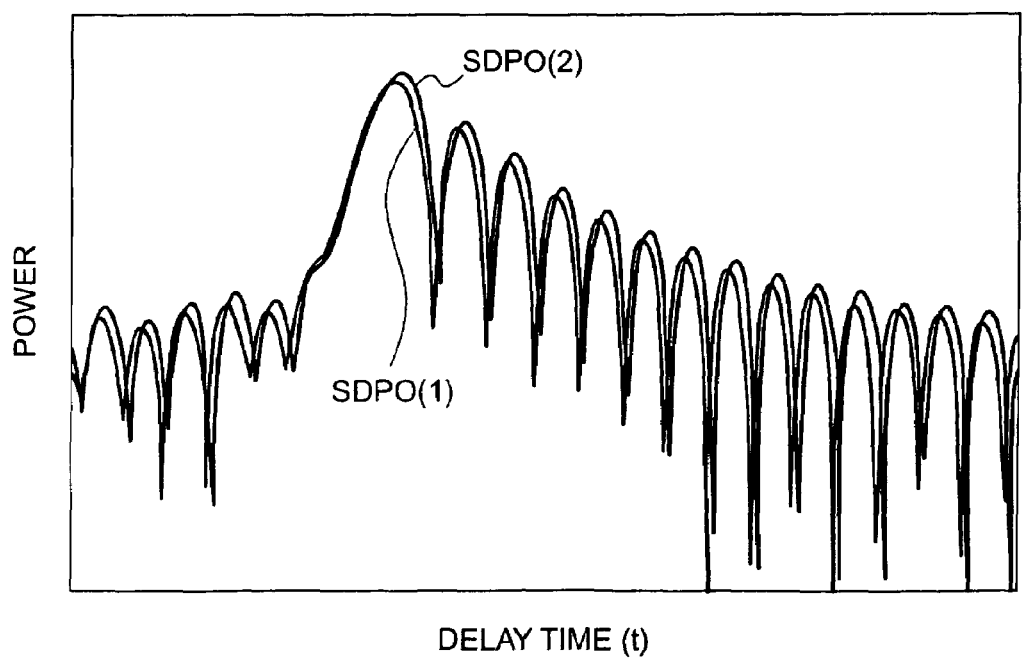
FIG. 9 is a view for explaining the operation of a time delay estimation unit 14c shown in FIG. 3.

FIG. 9 is a view for explaining the relationship between the delay profile SDPO(1) corresponding to the first OFDM signal SS0(1) and the delay profile SDPO(2) corresponding to the second OFDM signal SS0(2). Referring to FIG. 9, the abscissa t represents the delay time, and the ordinate represents the power.

Figure 10:
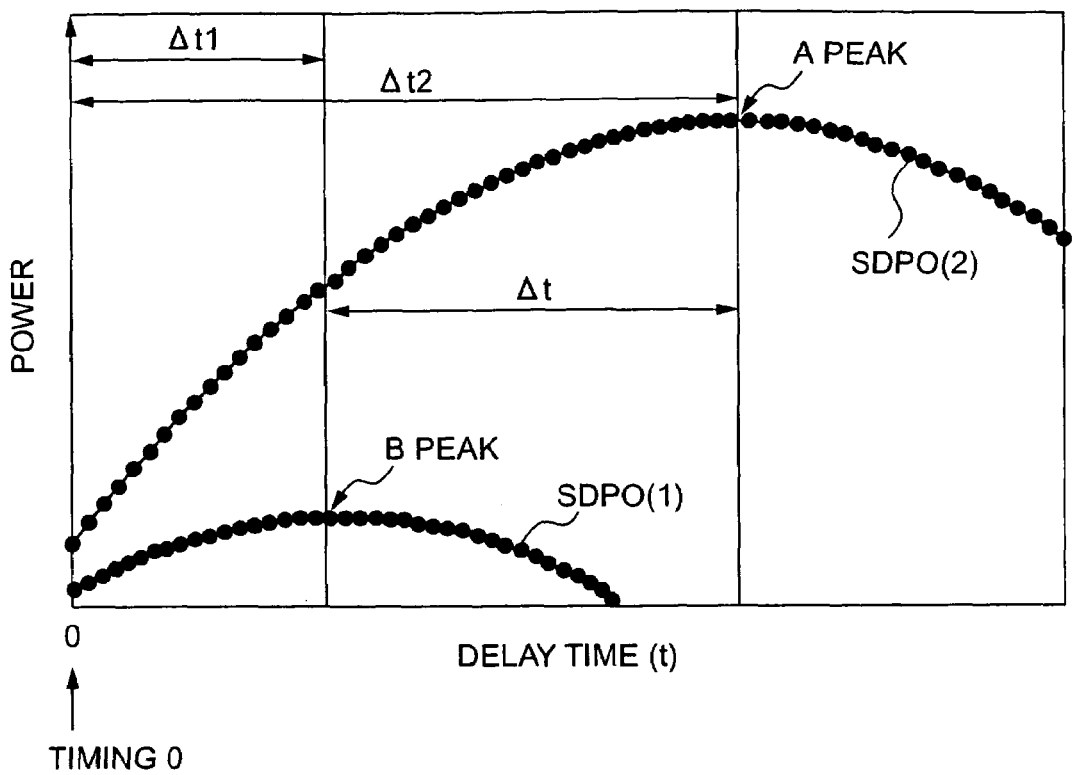
FIG. 10 is a partially enlarged view of FIG. 9.

FIG. 10 is an enlarged view of a portion containing a peak value B of the delay profile SDPO(1) and a peak value A of the delay profile SDPO(2) shown in FIG. 9. Referring to FIG. 10, the abscissa t represents the delay time, and the ordinate represents the power.

The time delay estimation unit 14c measures $\Delta t$ as the time lag between the peak value B of the delay profile SDPO(1) and the peak value A of the delay profile SDPO(2) shown in FIG. 10 and transmits the time compensation signal SDCO(2)=$\Delta t$ to the second signal generation unit 12.

On the basis of the received time compensation signal SDCO(2)=$\Delta t$, the second signal generation unit 12 advances the output timing of the second OFDM signal SS0(2) by $\Delta t$ as compared to that of the first OFDM signal SS0(1), as shown in FIG. 8, so that the transmission signal STX whose multiplexing timing shift is compensated for is generated by the multiplexing unit 13. Compensation of multiplexing timing shift in the multiplexing unit 13 can be done a plurality of number of times by using the pilot symbols contained in the transmission signal STX.

If a variation in $\Delta t$ caused by a temperature change or the like is small, a calibration mode is prepared in the first signal generation unit 11 and second signal generation unit 12. When the compensation-signal SDCO(1) and SDCO(2) which are input first are stored, compensation can be executed by using these fixed values.

In this embodiment, the delay time between a predetermined OFDM signal (the first OFDM signal in this embodiment) in a plurality of OFDM signals and the remaining OFDM signals (the second OFDM signal in this embodiment) except the predetermined OFDM signal in the plurality of OFDM signals is detected. The detected delay time is used as the compensation signal.

Instead, delay times (time $\Delta t1$ and time $\Delta t2$ in FIG. 10) between the plurality of OFDM signals and a predetermined timing (e.g., timing 0 in FIG. 10) may be detected, and the detected delay times may be used as compensation signals. In this case, the time delay estimation unit 14c measures the delay times (time $\Delta t1$ and time $\Delta t2$).

With the above operation, signal multiplexing can be implemented while compensating for the time lag between OFDM signals generated by different signal generation units.

Figure 11A:
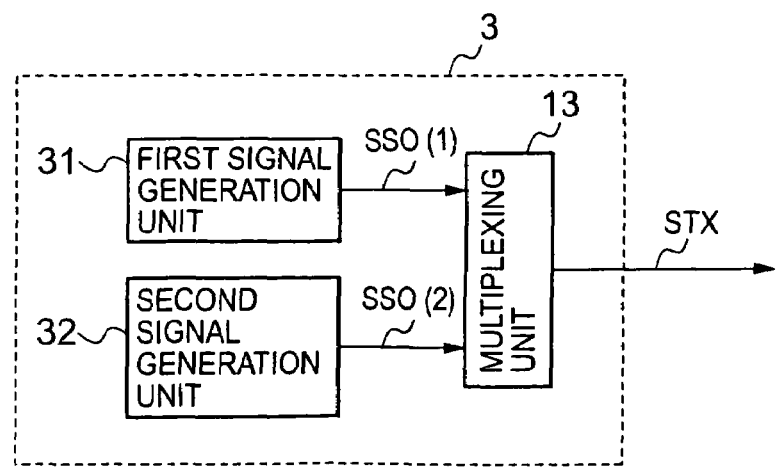
FIGS. 11A and 11B are block diagrams respectively showing a transmitting apparatus and a receiving apparatus in an OFDM communication system according to another embodiment of the present invention.
Figure 11B:
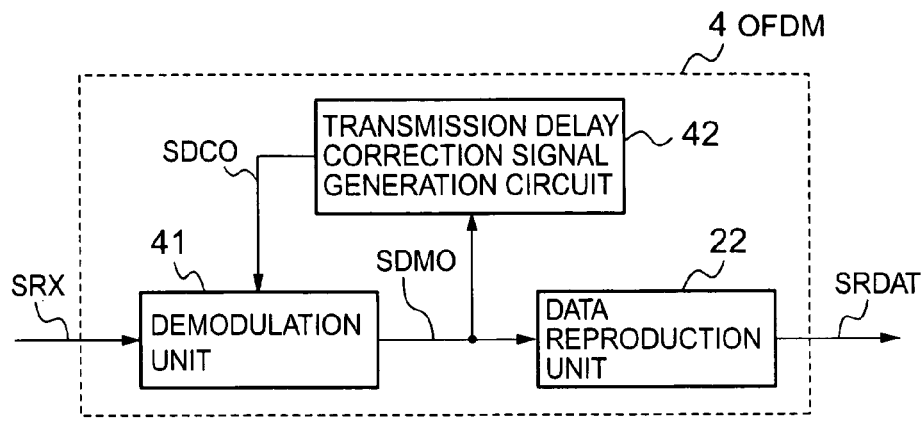

FIGS. 11A and 11B are block diagrams showing a second OFDM communication system according to another embodiment of the present invention. The same reference numerals as in the above-described drawings denote the same parts in FIGS. 11A and 11B.

Referring to FIGS. 11A and 11B, the OFDM communication system includes an OFDM transmitting apparatus 3 and OFDM receiving apparatus 4. The OFDM transmitting apparatus 3 includes a first signal generation unit 31, second signal generation unit 32, and multiplexing unit 13.

In this embodiment, two signal generation units are used as the plurality of signal generation units. However, the number of the plurality of signal generation units is not limited to two and can appropriately be changed.

The first signal generation unit 31 and second signal generation unit 32 have almost the same arrangement as that of the first signal generation unit 11 shown in FIG. 1A. The first signal generation unit 31 and second signal generation unit 32 are different from the first signal generation unit 11 in that OFDM signals are not controlled on the basis of a compensation signal.

The OFDM receiving apparatus 4 includes a demodulation unit 41, transmission delay correction signal generation circuit 42, and data reproduction unit 22.

The demodulation unit 41 receives a reception signal SRX corresponding to a transmission signal STX output from the multiplexing unit 13, executes OFDM demodulation for the received reception signal SRX, and outputs the OFDM-demodulated reception signal SRX as a demodulated signal SDMO.

The demodulation unit 41 also corrects the OFDM-demodulated reception signal SRX on the basis of a compensation signal SDCO output from the transmission delay correction signal generation circuit 42.

On the basis of the demodulated signal SDMO output from the demodulation unit 41, the transmission delay correction signal generation circuit 42 generates the compensation signal SDCO to correct the shift of input timing of the plurality of OFDM signals, in the demodulated signal SDMO, to the multiplexing unit 13. The generated compensation signal SDCO is output to the demodulation unit 41. More specifically, on the basis of pilot symbols contained in the demodulated signal SDMO, the transmission delay correction signal generation circuit 42 generates the compensation signal to correct the shift of input timing of the plurality of OFDM signals to the multiplexing unit 13.

For example, the transmission delay correction signal generation circuit 42 generates the delay profile of each of the plurality of OFDM signals on the basis of the pilot symbols contained in each of the plurality of OFDM signals in the demodulated signal SDMO. Then, on the basis of the plurality of generated delay profiles, the transmission delay correction signal generation circuit 42 generates the compensation signal to correct the shift of input timing of the plurality of OFDM signals to the multiplexing unit 13.

When two OFDM signals are used as the plurality of OFDM signals, as in this embodiment, the transmission delay correction signal generation circuit 42 generates the delay profile of a first OFDM signal SS0(1) on the basis of pilot symbols contained in it. In addition, the transmission delay correction signal generation circuit 42 generates the delay profile of a second OFDM signal SS0(2) on the basis of pilot symbols contained in it.

On the basis of the delay profile of the first OFDM signal SS0(1) and that of the second OFDM signal SS0(2), the transmission delay correction signal generation circuit 42 generates the compensation signal to correct the shift of input timing of the first OFDM signal SS0(1) and second OFDM signal SS0(2) to the multiplexing unit 13 and, for example, the shift of phase difference. The transmission delay correction signal generation circuit 42 outputs the generated compensation signal to the demodulation unit 41.

Figure 12:
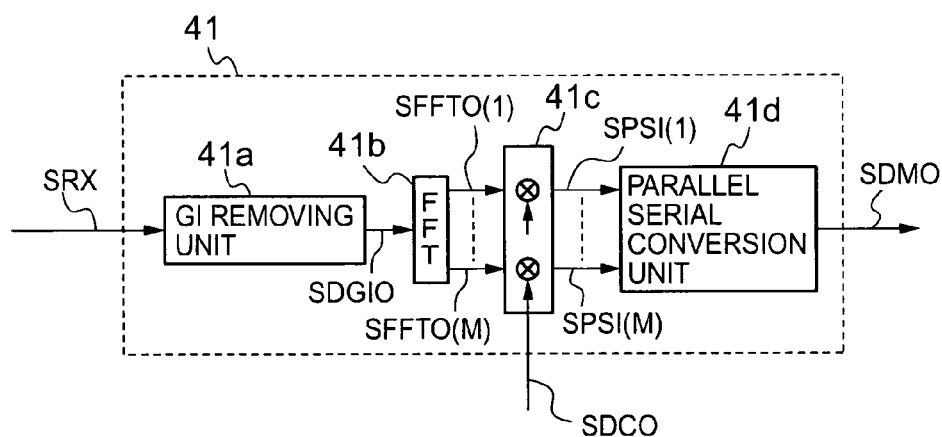
FIG. 12 is a block diagram showing an example of a demodulation unit 41 shown in FIGS. 11A and 11B.

FIG. 12 is a block diagram showing an example of the demodulation unit 41.

Referring to FIG. 12, the demodulation unit 41 includes a GI removing unit 41a, FFT 41b, phase variation amount correction unit 41c, and parallel-serial conversion unit 41d. The GI removing unit 41a removes the guard interval from the reception signal SRX and outputs the reception signal SRX without the guard interval as a GI removing unit output signal SDGIO.

The FFT 41b Fourier-transforms (OFDM-modulates) the GI removing unit output signal SDGIO and outputs the Fourier-transformed GI removing unit output signal SDGIO as Fourier transform output signals SFFTO(1) to SFFTO(M).

On the basis of the compensation signal and, more specifically, the phase variation amount compensation signal SDCO output from the transmission delay correction signal generation circuit 42, the phase variation amount correction unit 41c compensates for the phase variation difference generated by the shift of input timing of the first OFDM signal SS0(1) and second OFDM signal SS0(2) to the multiplexing unit 13 in the Fourier transform output signals SFFTO(1) to SFFTO(M). The Fourier transform output signals SFFTO(1) to SFFTO(M) whose phase variation difference is compensated for are output as parallel-serial conversion unit input signals SPSI(1) to SPSI(M).

The parallel-serial conversion unit 41d parallel-series-converts the parallel-serial conversion unit input signals SPSI(1) to SPSI(M) and outputs the parallel-serial-converted parallel-serial conversion unit input signals SPSI(1) to SPSI(M) as the demodulation unit output signal SDMO.

Figure 13:
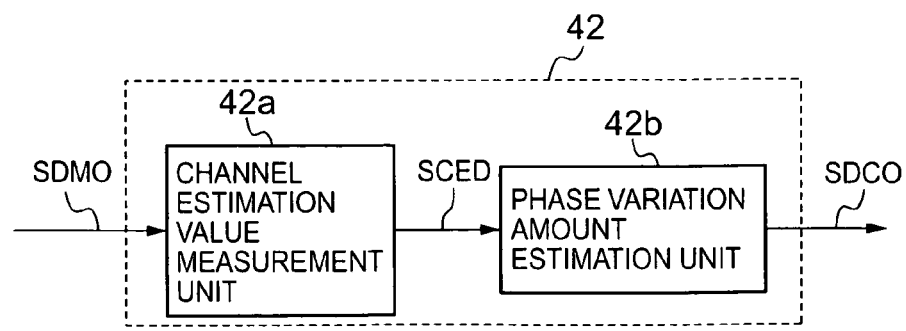
FIG. 13 is a block diagram showing an example of a transmission delay correction signal generation circuit 42 shown in FIGS. 11A and 11B.

FIG. 13 is a block diagram showing an example of the transmission delay correction signal generation circuit 42.

Referring to FIG. 13, the transmission delay correction signal generation circuit 42 includes a channel estimation value measurement unit 42a and phase variation amount estimation unit 42b.

The channel estimation value measurement unit 42a is formed by omitting the FFT 14a1 from the channel estimation value measurement unit 14a shown in FIG. 4. On the basis of pilot symbols contained in each OFDM signal in the transmission signal, the channel estimation value measurement unit 42a executes channel estimation corresponding to the OFDM signal and outputs the result of channel estimation for the OFDM signal as a channel estimation signal for the OFDM signal.

The phase variation amount estimation unit 42b detects a phase variation amount $\Phi(R)$ for each subcarrier in a second channel estimation signal SCEO(2) with respect to a first channel estimation signal SCEO(1). That is, the transmission delay correction signal generation circuit 42 detects, on the basis of the channel estimation values, the phase variation amount, of the plurality of OFDM signals in the demodulated signal, which is generated by the shift of input timing of the plurality of OFDM signals to the multiplexing unit 13.

The phase variation amount $\Phi(R)$ for each subcarrier in the second channel estimation signal SCEO(2) with respect to the first channel estimation signal SCEO(1) is output to the demodulation unit 41 and, more specifically, the phase variation amount correction unit 41c as the phase variation amount compensation signal SDCO(2).

The operation will be described next. The operation will be described below mainly in association with the points different from the embodiment shown in FIGS. 1A and 1B and, more specifically, the phase variation amount estimation unit 42b and demodulation unit 41.

Figure 14:
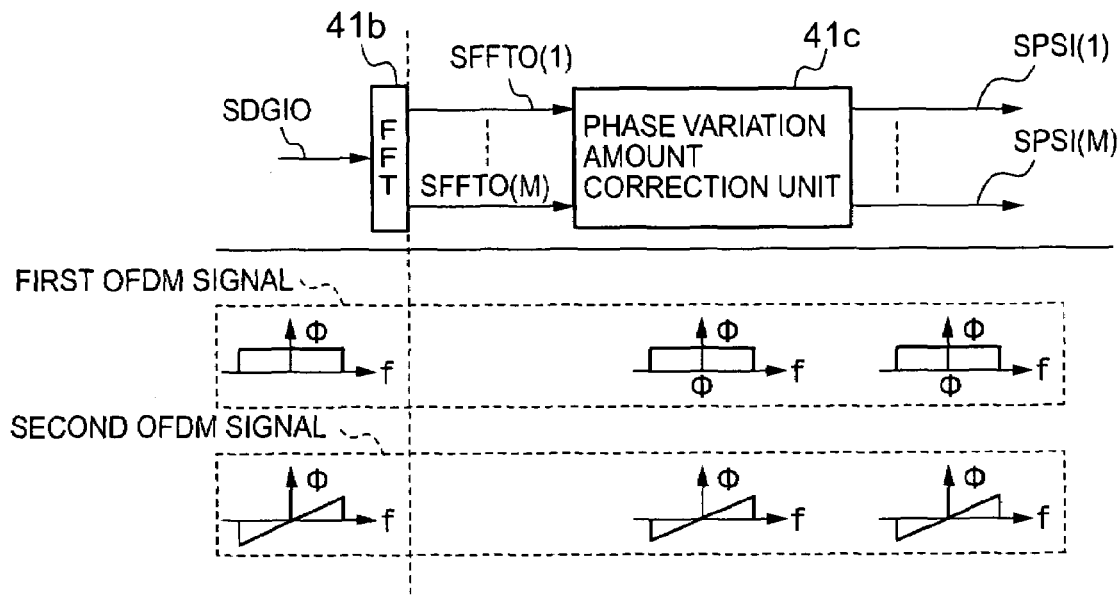
FIG. 14 is a view for explaining the operation of the OFDM communication system shown in FIGS. 11A and 11B.
Figure 15:
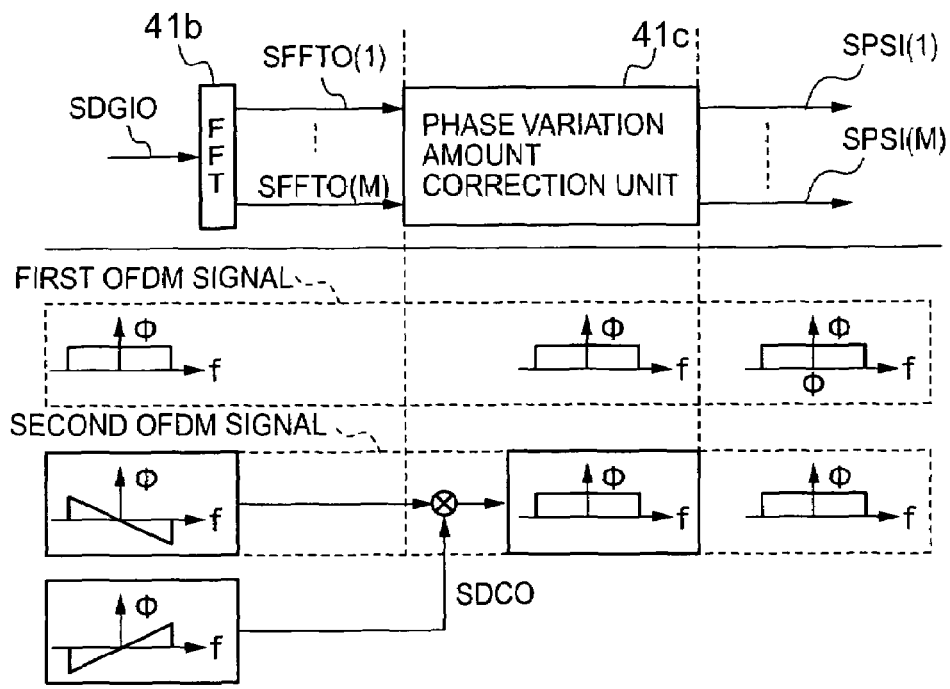
FIG. 15 is a view for explaining the operation of the OFDM communication system shown in FIGS. 11A and 11B.

FIGS. 14 and 15 are views for explaining an operation for compensating for the shift of input timing of the first OFDM signal SS0(1) and second OFDM signal SS0(2) to the multiplexing unit 13 on the frequency axis. The same reference numerals as in the above-described drawings denote the same parts in FIGS. 14 and 15.

Even when the first OFDM signal SS0(1) from the first signal generation unit 31 and the second OFDM signal SS0(2) from the second signal generation unit 32 are output at the same timing, the input timing of the first OFDM signal SS0(1) to the multiplexing unit 13 may be different from the input timing of the second OFDM signal SS0(2) to the multiplexing unit 13 because of the difference in length between the cable that transmits the first OFDM signal SS0(1) and the cable that transmits the second OFDM signal SS0(2).

For example, when the second OFDM signal SS0(2) is input to the multiplexing unit 13 with a time delay $\Delta t$ with respect to the first OFDM signal SS0(1), the multiplexing timing in the multiplexing unit 13 shifts by $\Delta t$. The phase variation amount estimation unit 42b executes an operation similar to that executed by the delay profile measurement unit 14b and time delay estimation unit 14c shown in FIG. 3, thereby estimating the time $\Delta t$.

In this case, the phase difference $\Phi(R)$ (R is an integer; $R \leq M$) for each subcarrier in the second OFDM signal SS0(2) with respect to the first OFDM signal SS0(1) in the reception signal SRX is $\Phi(R) = \Delta t \times (f(R) - fc)$, as shown in FIG. 14, where fc is the center frequency of the subcarrier frequency, and f(R) is the frequency of a subcarrier R.

The phase variation amount estimation unit 42b calculates the phase difference $\Phi(R)$ for each subcarrier in the second OFDM signal SS0(2) with respect to the first OFDM signal SS0(1) by using the estimated delay $\Delta t$ on the basis of the above-described arithmetic expression.

The phase variation amount estimation unit 42b outputs the phase difference Φ(R) for each subcarrier in the second OFDM signal SS0(2) with respect to the first OFDM signal SS0(1) to the phase variation amount correction unit 41c as the phase variation amount compensation signal SDCO(2) of the second OFDM signal SS0(2).

The phase variation amount correction unit 41c multiplies each of the Fourier transform output signals SFFTO(1) to SFFTO(M) (each subcarrier) for the second OFDM signal SS0(2) by the inverse characteristic about the phase variation amount compensation signal SDCO(2) of the second OFDM signal SS0(2), as shown in FIG. 15, to compensate for the phase variation difference generated by the shift of input timing of the first OFDM signal SS0(1) and second OFDM signal SS0(2) to the multiplexing unit 13.

The phase variation amount estimation unit 42b may output the phase variation amount compensation signal SDCO(1) of the first OFDM signal SS0(1). That is, the phase variation amount estimation unit 42b may detect the phase variation amount for each subcarrier in each of the channel estimation signals of the OFDM signals and output the detected phase variation amounts as compensation signal phase variation amounts.

In this embodiment, in the demodulation unit 41, the phase variation difference generated by the shift of input timing of the first OFDM signal SS0(1) and second OFDM signal SS0(2) to the multiplexing unit 13 is compensated for. In the demodulation unit 41, the time lag generated by the shift of input timing of the first OFDM signal SS0(1) and second OFDM signal SS0(2) to the multiplexing unit 13 may be compensated for.

In this case, the delay profile measurement unit 14b and time delay estimation unit 14c shown in FIG. 3 are used in place of the phase variation amount estimation unit 42b in the transmission delay correction signal generation circuit 42.

Figure 16:
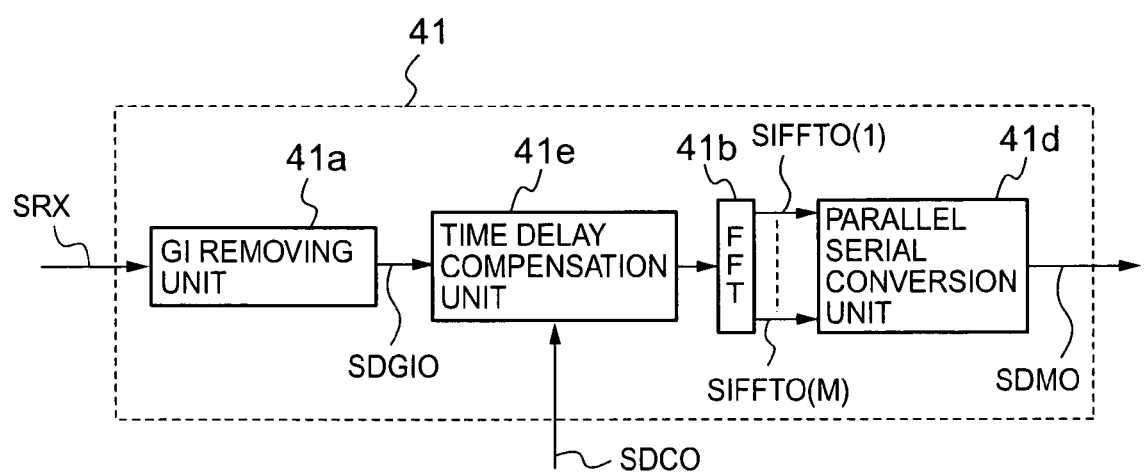
FIG. 16 is a block diagram showing another example of the demodulation unit 41 shown in FIGS. 11A and 11B.
Figure 17:
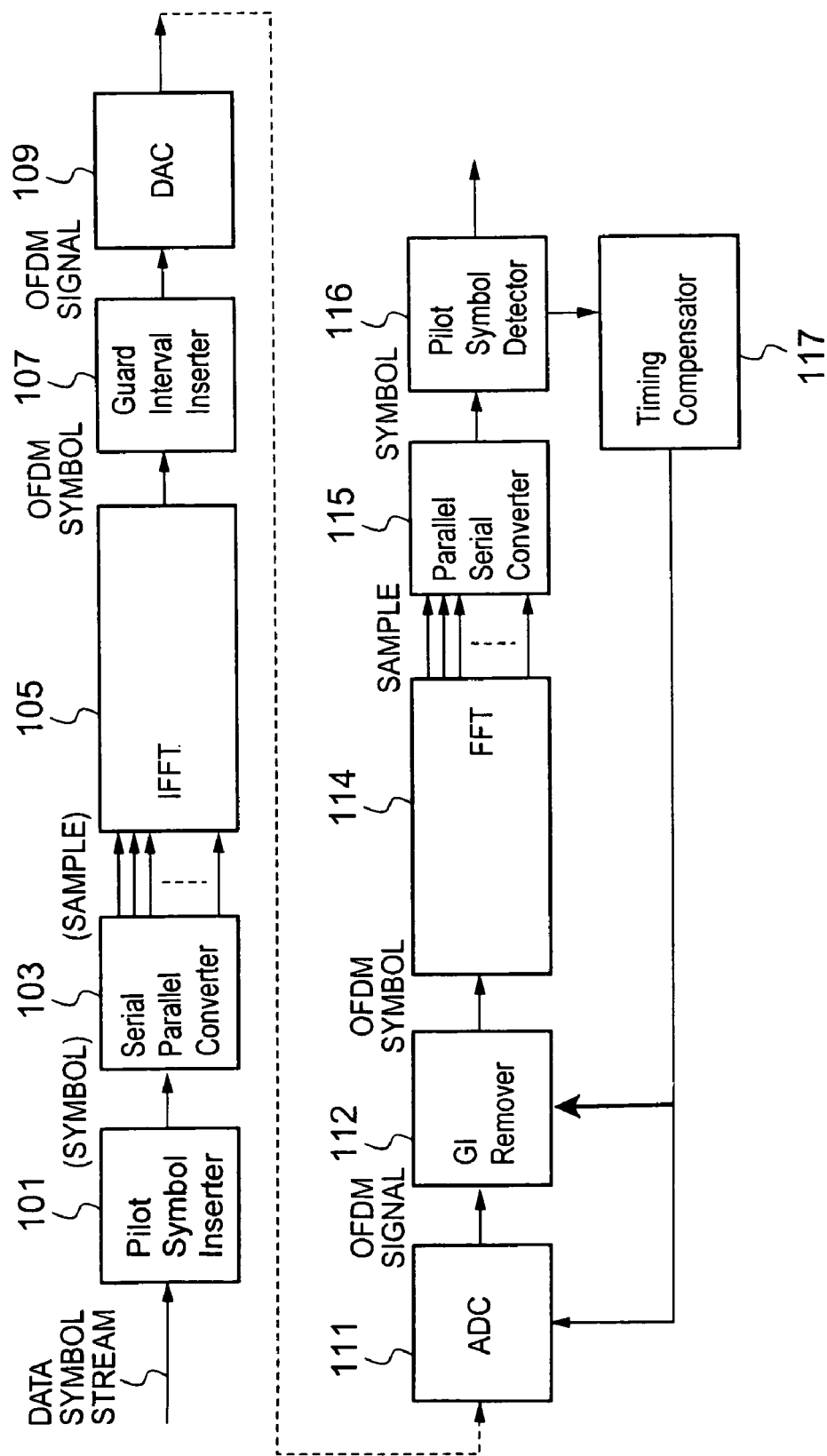
FIG. 17 is a block diagram showing a conventional OFDM communication system.
Figure 18A:
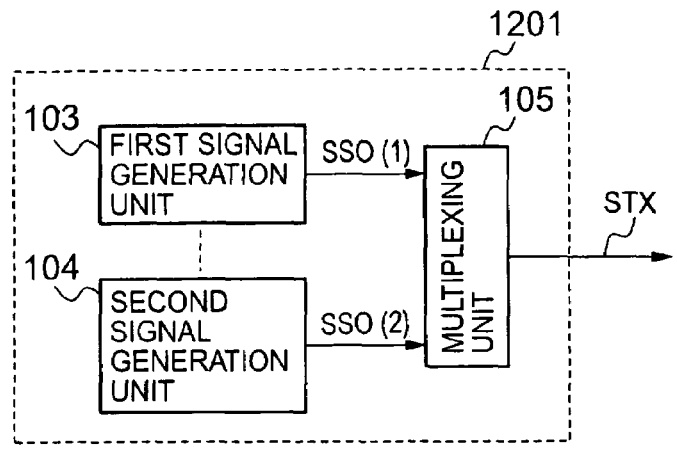
FIGS. 18A and 18B are block diagrams respectively showing a transmitting apparatus and a receiving apparatus in a conventional OFDM communication system.
Figure 18B:
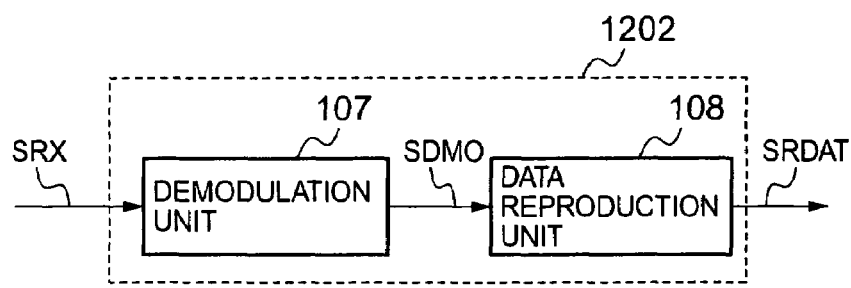
Figure 19:
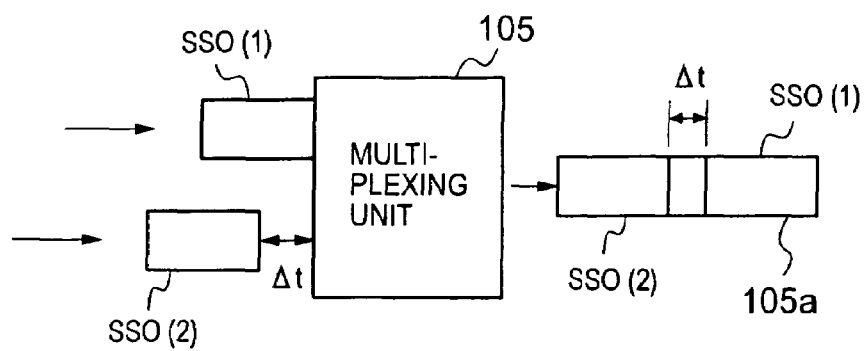
FIG. 19 is a view for explaining the operation of the conventional OFDM communication system shown in FIGS. 18A and 18B.
Figure 20:
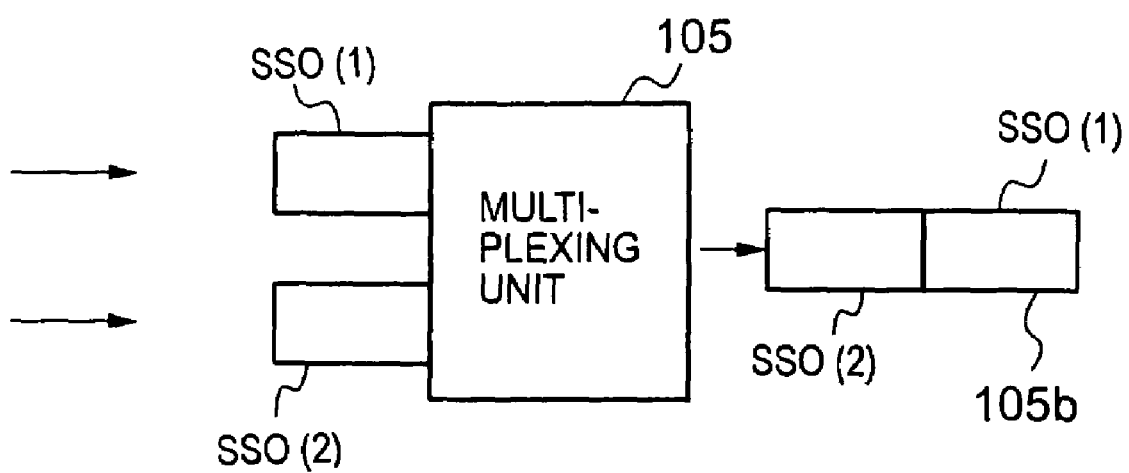
FIG. 20 is a view for explaining the operation of the conventional OFDM communication system shown in FIGS. 18A and 18B.

FIG. 16 is a block diagram showing another example of the demodulation unit 41 which uses the delay profile measurement unit 14b and time delay estimation unit 14c shown in FIG. 3 in place of the phase variation amount estimation unit 42b in the transmission delay correction signal generation circuit 42. The same reference numerals as in the above-described drawings denote the same parts in FIG. 16.

Referring to FIG. 16, a time delay compensation unit 41e compensates for the time lag generated by the shift of input timing of the first OFDM signal SS0(1) and second OFDM signal SS0(2) to the multiplexing unit 13 by adjusting the output timing of the OFDM signal contained in the reception signal SRX on the basis of the compensation signal output from the transmission delay correction signal generation circuit 14.

With the above operation, the delay difference between the OFDM signals generated by different signal generation units can be compensated for in the receiving apparatus.

The phase variation amount estimation unit 42b shown in FIG. 13 may be used in place of the delay profile measurement unit 14b and time delay estimation unit 14c in the transmission delay correction signal generation circuit 14 shown in FIGS. 1A and 1B. In this case, the transmission sequence generation unit 11a shown in FIG. 2 multiplies each of the samples of the symbols by the inverse characteristic of the phase variation amount compensation signal output from the transmission delay correction signal generation circuit 42 to compensate for the phase variation difference generated by the shift of input timing of the first OFDM signal SS0(1) and second OFDM signal SS0(2) to the multiplexing unit 13.

According to the embodiments, the shift of input timing of a plurality of OFDM signals to the multiplexing unit can be compensated for in the OFDM transmitting apparatus or OFDM receiving apparatus. Hence, any decrease in communication quality based on the variation of input timing of the plurality of OFDM signals to the multiplexing unit can be prevented.

The correction signal to correct the shift of input timing of the plurality of OFDM signals to the multiplexing unit is generated on the basis of pilot symbols contained in the plurality of OFDM signals which are multiplexed. For this reason, the correction signal can be generated by using existing pilot symbols.

In the above embodiments, each of the plurality of signal generation units outputs an OFDM signal containing pilot symbols. However, the signal output from each of the plurality of signal generation units is not limited to the OFDM signal containing pilot symbols. For example, the signal output from each of the plurality of signal generation units may be a signal containing pilot symbols.

In the above embodiments, each of the plurality of signal generation units outputs an OFDM signal having a plurality of subcarriers. However, the signal output from each of the plurality of signal generation units is not limited to the OFDM signal and can appropriately be changed.

Hence, according to the present invention, the shift of input timing of a plurality of signals to the multiplexing unit can be compensated for in the transmitting apparatus or receiving apparatus. Hence, any decrease in communication quality based on the shift of input timing of the plurality of signals to the multiplexing unit can be prevented.

The correction signal to correct the shift of input timing of the plurality of signals to the multiplexing unit is generated on the basis of pilot symbols contained in the plurality of signals which are multiplexed. For this reason, the correction signal can be generated by using existing pilot symbols.

In the above-described embodiments, the illustrated arrangements are merely examples, and the present invention is not limited to them.

What is claimed is:

1. A transmitting apparatus comprising:
   a plurality of signal generation units;
   a multiplexing unit which receives a plurality of signals output from said plurality of signal generation units and outputs, as a transmission signal, a signal obtained by time-divisionally multiplexing said plurality of signals; and
   a correction signal generation unit which outputs a correction signal generated on the basis of the transmission signal output from said multiplexing unit to at least one signal generation unit of said plurality of signal generation units,
   wherein upon receiving the correction signal, said at least one signal generation unit corrects a shift of input timing of said plurality of signals to said multiplexing unit on the basis of the correction signal.

2. An apparatus according to claim 1, wherein each of said plurality of signal generation units outputs a signal containing a pilot symbol, and said correction signal generation unit outputs the correction signal generated on the basis of the pilot symbol in each signal contained in the transmission signal to at least one signal generation unit of said plurality of signal generation units.

3. An apparatus according to claim 2, wherein said correction signal generation unit comprises:
   a channel estimation value generation unit which executes, for each signal contained in the transmission signal, channel estimation corresponding to the signal on the basis of the pilot symbol in the signal and outputs a result of channel estimation for each signal as a channel estimation signal for each signal, a delay profile generation unit which generates a delay profile for each signal on the basis of the channel estimation signal for each signal, said each signal being output from said channel estimation value generation unit, and outputs the generated delay profile for each signal as a delay profile signal for the signal, and a time delay estimation unit which generates, on the basis of the delay profile signal for each signal output from said delay profile generation unit, a time delay correction signal to correct a time lag of input timing of said plurality of signals to said multiplexing unit and outputs the generated time delay correction signal to at least one signal generation unit of said plurality of signal generation units, and wherein upon receiving the time delay correction signal, said at least one signal generation unit corrects an output timing of the signal on the basis of the time delay correction signal to correct the shift of input timing of said plurality of signals to said multiplexing unit.

4. An apparatus according to claim 2, wherein said correction signal generation unit comprises:

a channel estimation value generation unit which executes, for each signal contained in the transmission signal, channel estimation corresponding to the signal on the basis of the pilot symbol in the signal and outputs a result of channel estimation for each signal as a channel estimation signal for each signal, and a phase variation amount estimation unit which generates, on the basis of the channel estimation signal for each signal output from said channel estimation value generation unit, a phase variation amount correction signal to correct a phase variation amount of said plurality of signals which is generated on the basis of the shift of input timing of the signals to said multiplexing unit, and outputs the generated phase variation amount correction signal to at least one signal generation unit of said plurality of signal generation units, and wherein upon receiving the phase variation amount correction signal, said at least one signal generation unit corrects a phase of the signal on the basis of the phase variation amount correction signal to correct the shift of input timing of said plurality of signals to said multiplexing unit.

5. An apparatus according to claim 3, wherein said time delay estimation unit detects, on the basis of the delay profile signal for each signal output from said delay profile generation unit, a delay time between the input timing of a predetermined signal of said plurality of signals contained in the transmission signal to said multiplexing unit and that of a remaining signal except the predetermined signal of said plurality of signals contained in the transmission signal to said multiplexing unit, and uses the detected delay time as the time delay correction signal.

6. An apparatus according to claim 3, wherein said time delay estimation unit detects, on the basis of the delay profile signal for each signal output from said delay profile generation unit, a delay time of the input timing of said plurality of signals to said multiplexing unit with respect to a predetermined timing, and uses the detected delay time as the time delay correction signal.

7. An apparatus according to claim 5, wherein said delay profile generation unit comprises:

a serial-parallel conversion unit which serial-parallel-converts the pilot symbol contained in each of said plurality of signals into M (M equals the number of subcarriers) samples, a 0-interpolation unit which interpolates L (L is an integer; $L \geq 1$) samples 0 between an "M/2"th sample and a "1+M/2"th sample in an output signal from said serial-parallel conversion unit, and an inverse Fourier transform unit which executes inverse Fourier transform for each of the "M+L" samples and outputs a delay profile at a resolution corresponding to M/(M+L) samples.

8. An apparatus according to claim 4, wherein said plurality of signal generation units output a plurality of OFDM signals each having a plurality of subcarriers, and wherein said phase variation amount estimation unit detects, on the basis of the channel estimation signal for each of said plurality of OFDM signals output from said channel estimation value generation unit, a phase variation amount, with respect to a phase of a predetermined channel estimation signal of the channel estimation signals for said plurality of OFDM signals, of each subcarrier in the remaining channel estimation signal except the predetermined channel estimation signal, and uses the detected phase variation amount as the phase variation amount correction signal.

9. An apparatus according to claim 4, wherein said plurality of signal generation units output a plurality of OFDM signals each having a plurality of subcarriers, and wherein said phase variation amount correction signal generation unit detects a phase variation amount of each subcarrier in the channel estimation signals of said plurality of OFDM signals with respect to a phase reference value Q (Q is an arbitrary real number; $0 \leq Q < 2\pi$), and uses the detected phase variation amount as the phase variation amount correction signal.

10. An apparatus according to claim 1, wherein said plurality of signal generation units output a plurality of OFDM signals each having a plurality of subcarriers.

11. A communication system comprising:

a transmitting apparatus of claim 1; and a receiving apparatus which receives a transmission signal output from said transmitting apparatus.

12. An apparatus according to claim 1, wherein said plurality of signal generation units includes a first signal generation unit which outputs a first signal, and a second signal generation unit which outputs a second signal, a time of inputting said second signal to said multiplexing unit being delayed in relation to a time of inputting said first signal to said multiplexing unit by a time period $\Delta t$, and wherein said correction signal generation unit outputs the correction signal to the second signal generation unit and based on the correction signal, the second signal generation unit advances a time of outputting the second signal from the second signal generation unit by the time period $\Delta t$.

13. A multiplex timing compensation method executed by a transmitting apparatus including a plurality of signal generation units, and a multiplexing unit which receives a plurality of signals output from the plurality of signal generation units and outputs, as a transmission signal, a signal obtained by time-divisionally multiplexing said plurality of signals, comprising:

outputting a correction signal generated on the basis of the transmission signal output from the multiplexing unit to at least one signal generation unit of the plurality of signal generation units; and correcting a shift of input timing of said plurality of signals to the multiplexing unit on the basis of the correction signal output in said outputting the correction signal.

14. A method according to claim 13, wherein the plurality of signal generation units output a plurality of signals each containing a pilot symbol, and in said outputting the correction signal the correction signal is generated on the basis of the pilot symbol in each signal contained in the transmission signal, and output to at least one signal generation unit of the plurality of signal generation units.

15. A method according to claim 14, wherein said outputting the correction signal comprises:
executing, for each signal contained in the transmission signal, channel estimation corresponding to the signal on the basis of the pilot symbol in the signal and outputting a result of channel estimation for each signal as a channel estimation signal for each signal,
generating a delay profile for each signal on the basis of the channel estimation signal for each signal, said each signal being output in said executing the channel estimation, and outputting the generated delay profile for each signal as a delay profile signal for the signal, and
generating, on the basis of the delay profile signal for each signal output in the delay profile, a time delay correction signal to correct a time lag of input timing of said plurality of signals to the multiplexing unit and outputting the generated time delay correction signal to at least one signal generation unit of the plurality of signal generation units, and
wherein in said correcting said shift of input timing, when the time delay correction signal is input, an output timing of the signal is corrected on the basis of the time delay correction signal to correct the shift of input timing of said plurality of signals to the multiplexing unit.

16. A method according to claim 14, wherein said outputting the correction signal comprises:
executing, for each signal contained in the transmission signal, channel estimation corresponding to the signal on the basis of the pilot symbol in the signal and outputting a result of channel estimation for each signal as a channel estimation signal for each signal, and
generating a phase variation amount correction signal to correct a phase variation amount of said plurality of signals, which is generated on the basis of the shift of input timing of said plurality of signals to the multiplexing unit, on the basis of the channel estimation signal for each signal output in said executing the channel estimation, and outputting the generated phase variation amount correction signal to at least one signal generation unit of the plurality of signal generation units, and
wherein in said correcting said shift of input timing, when the phase variation amount correction signal is input, a phase of the signal output from the signal generation unit is corrected on the basis of the phase variation amount correction signal to correct the shift of input timing of said plurality of signals to the multiplexing unit.

17. A method according to claim 15, wherein in said generating the time delay correction signal, a delay time between the input timing of a predetermined signal of said plurality of signals contained in the transmission signal to the multiplexing unit and a delay time of a remaining signal except the predetermined signal of said plurality of signals contained in the transmission signal to the multiplexing unit is detected on the basis of the delay profile signal for each signal output in said generating the delay profile, and the detected delay time is used as the time delay correction signal.

18. A method according to claim 15, wherein in said generating the time delay correction signal, a delay time of the input timing of said plurality of signals to the multiplexing unit with respect to a predetermined timing is detected on the basis of the delay profile signal for each signal output in said generating the delay profile, and the detected delay time is used as the time delay correction signal.

19. A method according to claim 17, wherein said generating the delay profile comprises:
serial-parallel-converting the pilot symbol contained in each of said plurality of signals into M (M equals the number of subcarriers) samples,
interpolating L (L is an integer; L≧1) samples 0 between an "M/2"th sample and a "1+M/2"th sample in an output signal in said serial-parallel converting the pilot symbol, and
executing inverse Fourier transform for each of the "M+L" samples and outputting a delay profile at a resolution corresponding to M/(M+L) samples.

20. A method according to claim 16, wherein said plurality of signal generation units output a plurality of OFDM signals each having a plurality of subcarriers, and
in said generating said phase variation amount correction signal, a phase variation amount, with respect to a phase of a predetermined channel estimation signal of the channel estimation signals for said plurality of OFDM signals, of each subcarrier in the remaining channel estimation signal except the predetermined channel estimation signal of said plurality of OFDM signals is detected on the basis of the channel estimation signal for each of said plurality of OFDM signals output in said executing the channel estimation, and the detected phase variation amount is used as the phase variation amount correction signal.

21. A method according to claim 16, wherein said plurality of signal generation units output a plurality of OFDM signals each having a plurality of subcarriers, and
in said generating said phase variation amount correction signal, a phase variation amount of each subcarrier in the channel estimation signals of said plurality of OFDM signals with respect to a phase reference value Q (Q is an arbitrary real number; 0≦Q<2π) is detected, and the detected phase variation amount is used as the phase variation amount correction signal.

22. A method according to claim 13, wherein said plurality of signal generation units output OFDM signals each having a plurality of subcarriers.

23. A correction signal generation unit for a transmitting apparatus including plural signal generation units which generate plural input signals and a multiplexing unit which multiplexes the plural input signals and outputs a transmission signal including the plural input signals, comprising:
a channel estimation signal generation unit which generates a channel estimation signal for a signal of the plural input signals in said transmission signal;
a delay profile generation unit which generates, based on the channel estimation signal, a delay profile signal for the signal; and
a time delay estimation unit which:
generates, based on the delay profile signal, a time delay correction signal for correcting a delay in time of inputting the signal to the multiplexing unit relative to a time of inputting another signal in said plural input signals to the multiplexing unit; and
outputs the time delay correction signal to a signal generation unit in the plural signal generation units which generated said signal.

24. The correction signal generation unit of claim 23, wherein the plural input signals comprise an input signal including a pilot symbol, and the channel estimation signal generation unit detects the pilot symbol and generates the channel estimation signal based on the pilot symbol.

25. The correction signal generation unit of claim 23, wherein said plural multiplexed signals comprise time-divisionally multiplexed signals.

26. A method a correcting a delay in a time of inputting a signal of a plurality of input signals to a multiplexing unit of a transmitting apparatus, comprising:

generating a channel estimation signal for the signal;

generating, based on the channel estimation signal, a delay profile signal for the signal;

generating, based on the delay profile signal, a time delay correction signal for correcting a delay in time of inputting the signal to the multiplexing unit relative to a time of inputting another signal in said plural input signals to the multiplexing unit; and outputting the time delay correction signal to a signal generation unit which generated said signal.

* * * * *